March 1, 1932.  A. LUTZ  1,847,618
GAS METER
Filed July 9, 1928
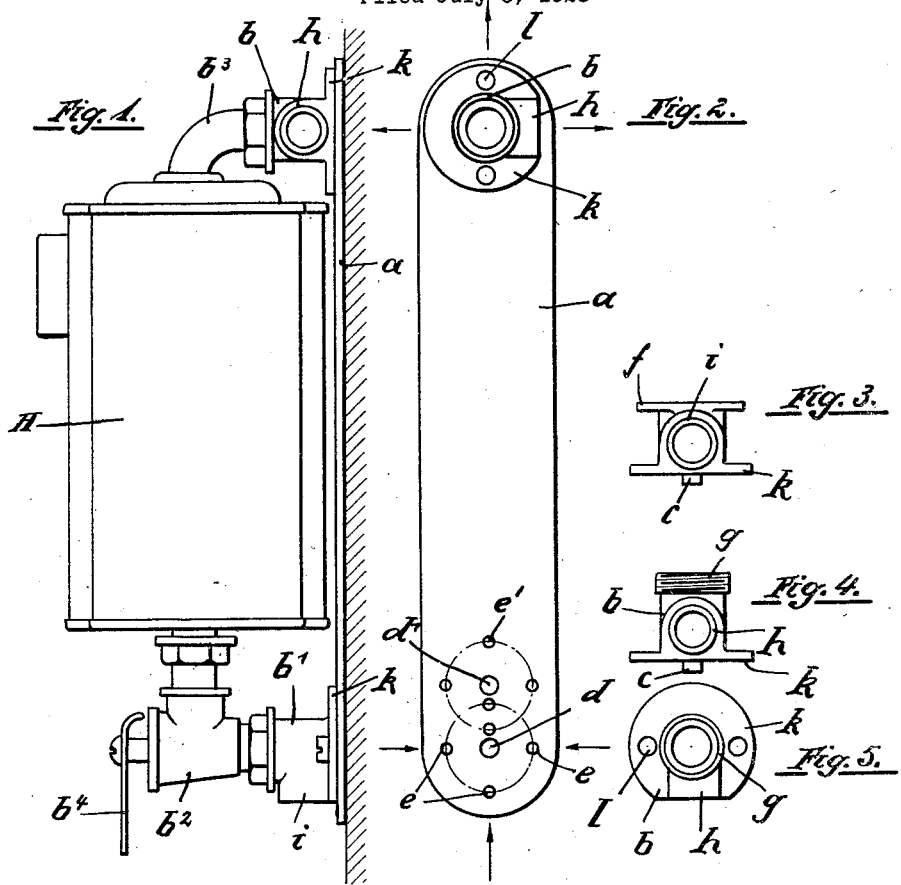
Inventor:
Anton Lutz
by Heinkaus
Atty.

Patented Mar. 1, 1932

1,847,618

UNITED STATES PATENT OFFICE

ANTON LUTZ, OF STUTTGART, GERMANY

GAS METER

Application filed July 9, 1928, Serial No. 291,156, and in Germany July 13, 1927.

My invention relates to gas meters and more particularly to means for connecting gas meters to gas mains. It is an object of my invention to provide a connection which can be readily adapted to any given position of such mains. To this end I provide fittings on a base plate and means for varying the position of the fittings with respect to the plate by turning them about an axis.

Gas meters are as a rule mounted on a rigid connecting or foundation plate on which fittings are provided for connecting the gas meter to the gas main. Hitherto the fittings were secured to the base plate in invariable position so that it was necessary to provide bends or other connections if the fittings did not suit the position of the gas mains to which the gas meter was to be connected.

This drawback is overcome according to my invention in which the position of the fittings on the base plate are so arranged as to be adapted to the gas main. A base plate on which the fittings have been arranged in the desired position is always ready for securing thereto a gas meter if the former gas meter has been removed or exchanged, and they will not exert any stress on the gas meter as they have been fixed beforehand in the proper position. Nor is the weight of the gas meter transmitted onto the gas main but is carried by the fittings on the base plate, and consequently by the plate itself.

In the drawings affixed to this specification and forming part thereof my invention is illustrated diagrammatically by way of example as adapted to a vertical and a horizontal gas meter.

In the drawings

Fig. 1 is an elevation of a vertical gas meter,

Fig. 2 is an elevation of its base plate, with one of the fittings in position,

Fig. 3 is an elevation of a fitting, having flanges at either end,

Fig. 4 is an elevation of a fitting having a thread at one end, and a flange at the other, Fig. 5 is a plan view of the threaded fitting, Fig. 6 is a plan view of a horizontal gas meter.

Referring first to Figs. 1–5, A is a vertical gas meter, $a$ is its foundation plate, $b$ and $b'$ are fittings on this plate, $b^3$ is a bend connecting the upper fitting $b$ with the upper end of the gas meter and $b^2$ is a similar connection for the fitting $b'$, but provided with a cock and a handle $b^4$.

Each fitting ($b$ and $b'$) is equipped with two connections at right angles, one of these connections, at the threaded end $g$, (Fig. 4) being arranged coaxially with respect to the fitting, the other one (the pipe $h$ at the fitting $b$ or the pipe $i$ at the fitting $b'$) extending at right angles to the axis for connection with the main (not shown). Each fitting is provided with a flange $k$ for connecting it to the base plate and with a flange $f$ (Fig. 3) or a thread $g$ (Figs. 4 and 5) for connecting it to the meter A. The flange $f$ may be provided with holes, not shown, in the usual manner for attaching thereto a corresponding flange on the connections or pipes $b^2$ or $b^3$, but in the examples illustrated the pipes $b^2$ and $b^3$ have been shown as connected to the fittings $b'$ by means of the threads $g$, Figs. 4 and 5, and cap nuts. The flange $k$ is provided with any desired number of holes $l$ for the reception of screws, and corresponding sets of holes $e$ are provided in the base plate $a$ in circular arrangement. In the arrangement shown in the drawings four holes $e$ are provided, so that the fittings may be arranged for three different positions of the connection $h$ or $i$ and consequently may be fitted to mains arranged as indicated by the arrows in Fig. 2. The arrows indicate the positions of the pipes $h$ or $i$. It will appear that the fittings may be fixed either with the pipes $h$ and $i$ pointing to the right, as shown for the pipe $h$ in Fig.

1, or to the left, or to the ends of the plate *a*. They might also be fixed in a fourth position, with the pipes pointing to the centre of the plate *a*, but this is impracticable as in this position the ends of the pipes *i*, *h* would come so close to the meter A that connections could not be arranged. Obviously any number of holes may be provided in one set, or two or more sets as proposed may be provided in the base plate, as indicated at *e'* in Fig. 2.

Preferably the fittings *b*, *b'* are provided with a central pin *c* below the flange *k* which is inserted in a hole *d* or *d'* of the plate *a*.

Referring now to Fig. 6, the arrangement of the fittings *b*, *b'* is the same as described with reference to the previous figures, but in this case the gas meter A is fixed on its base plate *a* in horizontal position.

I wish it to be understood that I do not desire to be limited to the exact details of construction shown and described for obvious modifications will occur to a person skilled in the art.

I claim:—

1. A support for a gas meter, comprising a plate, a fitting having means for connecting it with said meter and a gas main, and a flange on said fitting having holes adapting it to be secured to said plate, said plate having a set of holes adapted to register with the holes in said flange in various positions of said fitting with respect to said plate, and means adapted to be inserted through the registering holes for holding the fitting to the plate.

2. A support for a gas meter comprising a plate adapted to be secured to a wall or other structure, two fittings on said plate, means for connecting said fittings to said plate in various positions about an axis extending transversely to said plate, and means on said fittings for connecting them to said meter and to a gas main.

In testimony whereof I affix my signature.

ANTON LUTZ.